J. B. WHITE.
Omnibuses.

No. 157,048. Patented Nov. 17, 1874.

UNITED STATES PATENT OFFICE.

JAMES B. WHITE, OF FORT WAYNE, INDIANA.

IMPROVEMENT IN OMNIBUSES.

Specification forming part of Letters Patent No. 157,048, dated November 17, 1874; application filed May 13, 1874.

*To all whom it may concern:*

Be it known that I, JAMES B. WHITE, of Fort Wayne, in the county of Allen and State of Indiana, have invented certain new and useful Improvements in Omnibuses; and I do hereby declare that the following is a full and exact description thereof, reference being had to the accompanying drawings, and to the letters of reference marked thereon, in which like letters refer to like parts in the different figures.

To enable others skilled in the art to make and use my invention, I will proceed to describe its construction and operation.

Figure 1:
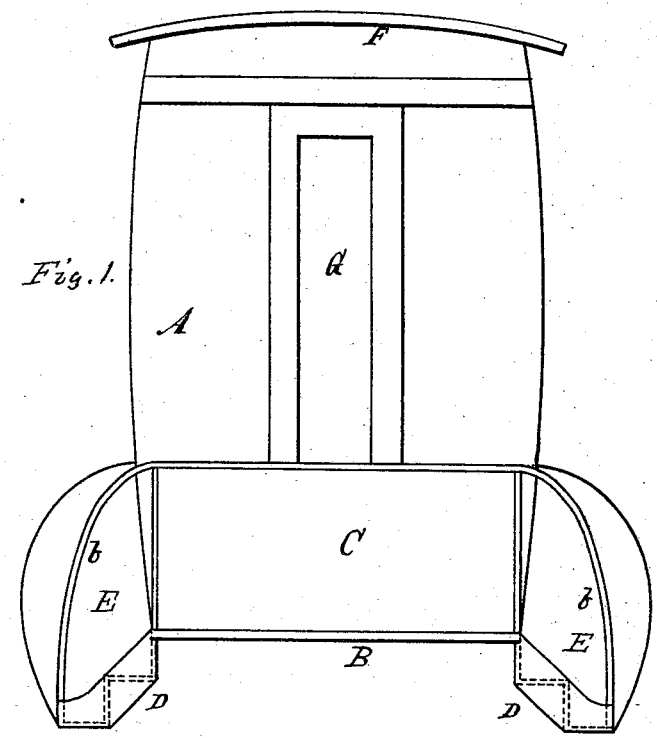
Figure 2:
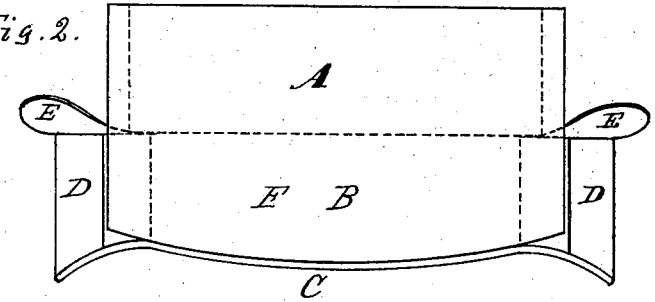

Figure 1 is an elevation. Fig. 2 is a plan view.

The nature of my invention consists in the application to omnibuses of certain devices for the purpose of facilitating the egress and ingress of passengers to and therefrom.

In the drawings, A represents that portion of the body of an omnibus in the rear of the wheels. B represents a platform, which extends a suitable distance to the rear, and is curved on its rear edge, as seen in Fig. 2. On the rear edge of said platform is secured a guard, C, of suitable height, which is also curved to correspond with the edge of said platform. D D represent steps, which are secured to the sides of platform A. They extend outward so as to come nearly flush with the outside line of the wheels, which are immediately in their front. The rear ends of said steps are curved back, as seen in Fig. 2. A hand-rail, b, extends from the upper corners of the guard C to the outer rear corner of the lower step. Said hand-rail is curved so as to correspond with the curve of the platform. E E represent wings, which are secured to the sides of the body, and also to the steps. Said wings are formed substantially as seen in Fig. 1, and are curved outward, as seen in Fig. 2. F represents a continuation of the roof of the omnibus, which projects over the platform. G represents a sliding door, which moves in suitable ways, as will be seen in Fig. 1.

When in operation the egress and ingress of passengers is greatly facilitated by their being enabled to get upon the platform on either side, thus obviating the necessity of one or more passengers awaiting the movements of another, and also preventing the possibility of accident, especially to aged people, who are not very active. Another and most important advantage arises from this arrangement—that is, the facility with which passengers may be discharged and received at hotels, &c., by driving up to the sidewalk parallel therewith. The steps will range, so as to enable the passengers to reach said sidewalk much more easily and with far greater safety than can be done by the arrangement in ordinary use, and thus obviate the necessity of turning and backing the omnibus up against the walk, to the great annoyance of driver and passengers, and damage to the omnibus. The wings E serve to protect the passengers from the wheels of the carriage, and also prevent the wheels from throwing mud on the steps.

I am aware of the patent of Chauncy M. Murch, issued February 10, 1874, and therefore do not claim the combinations presented; neither do I claim a platform and side steps for passenger-cars or omnibuses; but What I do claim as new, and desire to secure by Letters Patent, is—

Platform B and steps D, in combination with guard C, hand-rail b, and wings E, all constructed and applied to street-omnibuses as set forth.

J. B. WHITE.

Attest:
H. F. WILLSON,
J. GREENSFELDER.